United States Patent [19]

Scholes

[11] Patent Number: 4,471,016

[45] Date of Patent: Sep. 11, 1984

[54] ARTICLE HAVING A SCRATCH RESISTANT LUBRICATED GLASS SURFACE

[75] Inventor: Addison B. Scholes, Muncie, Ind.

[73] Assignee: Ball Corporation, Muncie, Ind.

[21] Appl. No.: 374,121

[22] Filed: May 3, 1982

Related U.S. Application Data

[62] Division of Ser. No. 239,241, Mar. 2, 1981, Pat. No. 4,343,641.

[51] Int. Cl.³ ........................ B32B 3/02; B32B 17/06
[52] U.S. Cl. .................................. 428/201; 428/143; 428/206; 428/210; 428/323; 428/325
[58] Field of Search ............... 428/141, 325, 201, 323, 428/206, 332, 210, 143; 427/199, 203, 204, 279; 65/60.2, 60.3, 60.5

[56] References Cited

U.S. PATENT DOCUMENTS

| | | | |
|---|---|---|---|
| 1,580,921 | 4/1926 | Scherer | 427/199 |
| 2,592,258 | 4/1952 | Economakis | 65/60.2 |
| 3,989,864 | 11/1976 | Hey et al. | 65/60.3 |

Primary Examiner—Paul J. Thibodeau
Attorney, Agent, or Firm—Gilbert E. Alberding

[57] ABSTRACT

A method of increasing the abrasion resistance of glass articles is disclosed. It has been found that by providing a vitreous substrate with a micro-roughened surface and an overlayer of dry lubricious organic coating, substantially increased lubricity and abrasion resistance is obtained. When the micro-roughened surface is provided by bonding a discontinuous distribution of discrete particulate material to the surface, a substantial increase in abrasion resistance and lubricity is realized even without the overlayer of dry lubricious coating thereby making the present invention particularly adaptable to use in the hot end of a glassware manufacturing process. Further, when the particulate material is fusible at about the annealing temperature of the glassware and is applied at the hot end, the particulate material will protect the glass surface through the hot end by bearing the major part of any loads created by contact between the glassware and other objects in its transport through the hot end. Upon being annealed, the particulate material will fuse and self-heal itself of any damage caused by such contact.

In the preferred embodiment, glass frit of a low-fusing temperature having a size range of between under 1 micron to about 100 microns is applied over between 5 percent and 85 percent of the surface area of glassware. The frit is then fused to the glassware and upon cooling, an overlayer of dry lubricious organic coating is applied. The frit is preferably applied electrostatically while the glass is hot through dry powder deposition or with a liquid carrier. Great uniformity in applying minute amounts of particulate material has been achieved by on-site grinding the particulate material to an air-carriable size with a fluid energy mill. The particulate material is air exhausted from the mill and directly applied thereby avoiding problems presented by agglomeration of the low micron range particles.

4 Claims, 1 Drawing Figure

ARTICLE HAVING A SCRATCH RESISTANT LUBRICATED GLASS SURFACE

This is a division of U.S. application Ser. No. 239,241 filed on Mar. 2, 1981, now U.S. Pat. No. 4,343,641 issued Aug. 10, 1982.

BACKGROUND OF THE INVENTION

The present invention relates to the manufacture of glass articles and, more particularly, to improved hot and cold end coatings and the vitreous articles having an improved abrasion resistant surface which are produced thereby including glassware, glass and glazed surfaces. Vitreous surfaces have, especially immediately following the formation of the surface, high free energy. The nature of the surface makes it highly susceptible to damage by being contacted with other surfaces and/or atmospheric influences. A large part of the sensitivity which vitreous surfaces exhibit to contact with other surfaces is thought to occur due to the high coefficient of friction between vitreous surfaces and other surfaces, including vitreous surfaces, which are generally encountered in a glass production line and in the subsequent filling and packaging line. This high coefficient of friction, which may exceed one (1), will result in high forces being generated on the vitreous surface at the point of contact with other surfaces regardless of the relative directional components between the surfaces. Such forces may cause fracture or abrasion of the surface, giving rise to a substantially weakened structural integrity for the underlying article.

As is well known in the art, the problems of abrasion and fracture to glassware have been mitigated by various surface treatments applied to the glass substantially immediately following formation of the article or at least prior to packing.

One basic facet of such treatments is the surface treatment of the glass, prior to annealing, with various metallic compounds which pyrolytically decompose upon contact with the heated, freshly formed glass to form metallic oxide surface layers on the glass. Such metallic oxide coatings are frequently called "hot end" coatings because they are applied after the formation of the glassware and prior to its entrance into the annealing lehr. Such metallic coatings are frequently formed from tin oxide or titanium dioxide to provide a measure of abrasion resistance. In themselves, however, such metallic oxide coatings do not provide an adequate measure of scratch resistance or surface lubrication and have been combined with outer coatings of a lubricating film of, for example, polymeric material. The outer lubricating films of polymeric material are applied at the "cold end" of the lehr. Such combined coatings of metal oxide and lubricating films provide a desirable measure of scratch resistance and a lubricated glass surface.

Although hot end coatings do not, in themselves, provide sufficient abrasion resistance and lubricity for subsequent ware handling, they do provide an important degree of protection to glass surfaces while in the hot end of a glass production line. The newly formed glass articles are especially susceptible to damage from contact with other surfaces. As the glass surfaces are still near their forming temperature during their travel through the hot end, contact between them may cause seizure and extensive damage to the surfaces. Furthermore, the outer surfaces cool much quicker than the inner glass thereby experiencing high tensile forces. As is well known in the art, the strength of glass is greatly reduced when in tension, and abrasions or fractures have a much greater propensity to propagate thereby seriously reducing the structural strength of the glass article. The subsequent annealing of the glass articles relieves the tensile forces and places the outer surface in compression providing a much stronger article which has greater resistance to abrasion. Such annealing will not, however, repair or remedy flaws produced during the hot end travel of the glassware. Therefore, although hot end coatings cannot in themselves provide a sufficient degree of protection for glass surfaces during later travel and handling, it is desirable that they provide a significant degree of protection from the generation of irreversible flaws and damage when the hot glass surface is in its especially delicate state during its travel through the hot end of a glass production line.

There are many difficulties with the present methods of using hot end metallic oxide coatings. The coatings are expensive; they require special equipment; and they result in air pollution and/or corrosion from their by-products. A number of efforts have been made to provide scratch resistance and lubricity to glass surfaces without the use of such metallic coatings. Such efforts have included spraying the heated glassware during its manufacture and while it is at a temperature of 300° to 500° F., with a polymerizable monomeric system or a low molecular weight polymer in the absence of a solvent or other volatile unreactive diluent, as set forth in U.S. Pat. No. 3,713,867. Another such effort has included forming a protective surface coating by an emulsion of hard wax on the surface of the glassware while it is at the temperature of from about 175° to 212° F., as set forth in U.S. Pat. No. 3,997,693.

Other efforts to provide increased scratch resistance and lubricity have included applying onto glassware, which has been previously coated with an inorganic metallic oxide coating as set forth above, an aqueous dispersion of ionomeric polymer and colloidal silica in the form of discrete particles rather than as a continuous film, as set forth in U.S. Pat. No. 3,984,608. Another suggestion is to provide plastic-coated bottles with hard, smooth, friction-reducing surfaces such as those provided by spherical glass beads embedded in or attached to the plastic covering, as set forth in U.S. Pat. No. 3,924,767.

It is a principal object of the present invention to provide improved glass surfaces which have desirable scratch resistance and lubricity and are capable of manufacture from hot and cold end coatings which are inexpensive, do not require special equipment and do not result in air pollution or corrosion from their by-products.

It is a further object of the present invention to eliminate the need for metallic oxide coatings in the hot end of a commercial glass line.

It is a further object of the present invention to provide an improved method of applying a particulate dry coating material to an article.

It is a further principal object of the present invention to provide a hot end coating which self-heals any damage occurring during travel through the hot end of a glass manufacturing line.

It is a further object of the present invention to produce scratch resistant and lubricious glass surfaces which meet the commercial standards of the glass industry.

It is a further object of the present invention to provide a hot end coating which coacts with a cold end coating to retain and present a boundry layer lubricant at the vitreous substrate surface.

It is a further object of the present invention to provide a vitreous substrate having an exterior structure which substantially reduces the severity of fractures and plastic deformation occasioned by contact with other or like surfaces.

It is a further object of the present invention to provide an energy efficient and inexpensive method of producing such an exterior structure.

SUMMARY OF THE INVENTION

The present invention relates to a simple and inexpensive procedure to substantially upgrade the scratch resistance of a vitreous surface. In its broadest aspect, the present invention contemplates applying a discontinuous distribution of particulate material over a vitreous surface and bonding said particulate material thereto. It has been found that both abrasion resistance and lubricity of the surface are improved by such an application. Another advantage of the present invention is that the particulate material may be applied at the hot end as a protective self-heating hot end coating. Further, it has been discovered that a surprising increase in lubricity and abrasion resistance may be gained by coating a vitreous surface prepared in accordance with the above with a dry lubricious organic material such as polyolefins and the like. Such surfaces exhibit commercially acceptable values of abrasion resistance and lubricity.

BRIEF DESCRIPTION OF THE DRAWING

The FIGURE is an illustration of a preferred apparatus for producing improved vitreous substrates.

DETAILED DESCRIPTION OF THE INVENTION

Figure 1:
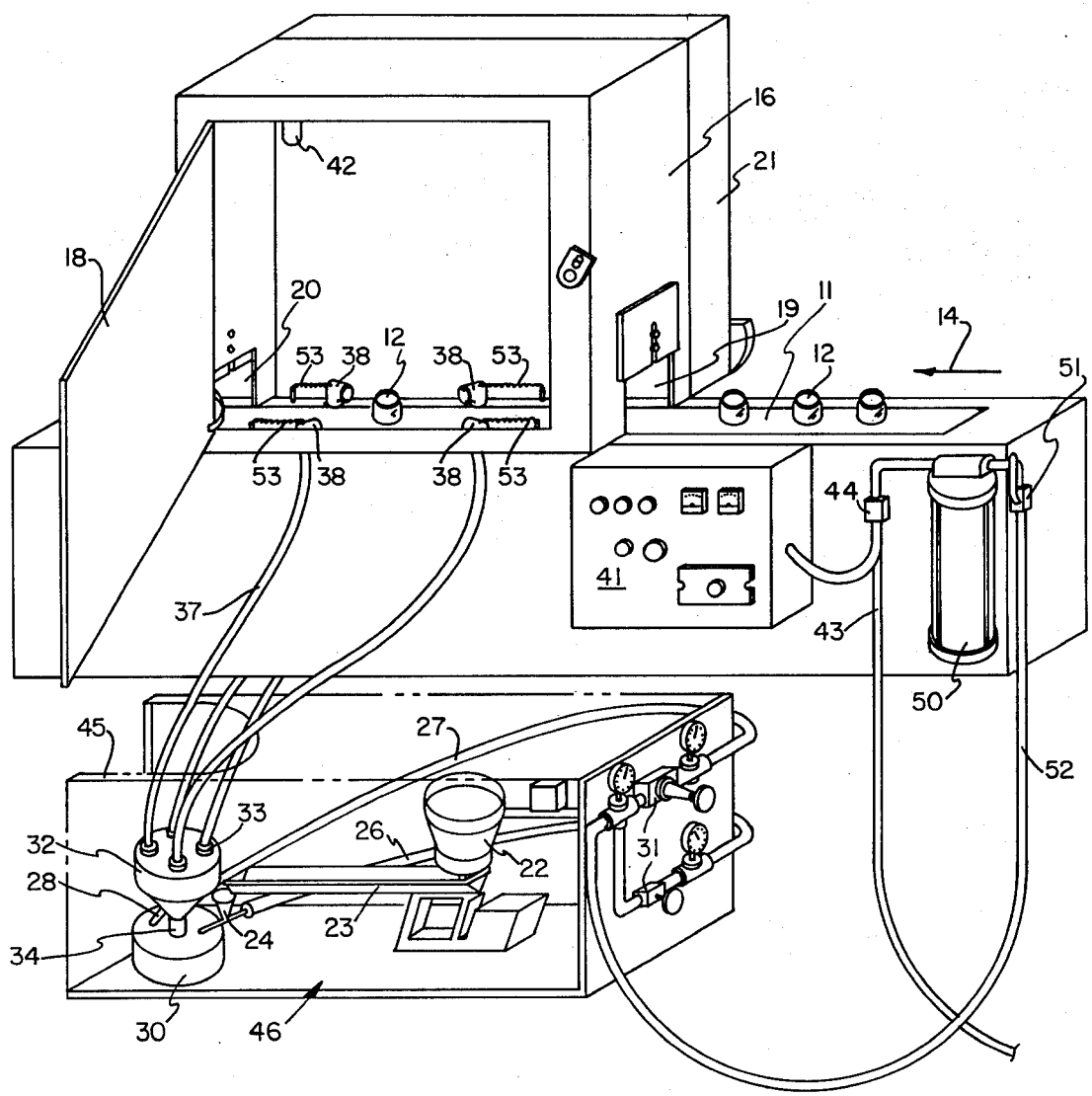

In accordance with the invention, a scratch-resistant lubricated glass surface is manufactured by providing a charged spray of fine particles of a solid material, such as glass particles having a size of minus 200 mesh capable of adhesion to the glass surface; depositing the fine particles on the glass surface which can be treated for adhesion of the fine particles; and applying to the glass surface, with its adhering fine particles of solid material, a dry lubricious outer coating such as an organic polyolefin like polyethylene. The fine particles of solid material may be suspended in water which is atomized to form a spray of droplets of liquid carrier including the fine particles of solid material. The spray can be deposited, preferably electrostatically, on the glass surface which is heated to its annealing temperature and maintained at a spray-attracting potential. The water will be vaporized, and the fine particles of solid material will be bonded to the glass surface varying degrees of security. Upon cooling of the glass surface below the degradation temperature of the dry lubricious organic materials, it is provided with a coating of such a material. By such methods, an article having a glass surface comprising a distribution of finely divided particles, such as glass particles having a size of minus 200 mesh, with an over coating of lubricious organic material such as polyethylene, can be manufactured and provided with a desirable scratch resistance and a lubricated coating. Glassware manufactured with this method exhibit dry surface lubricity and scratch resistance that exceeds commercial standards.

In a commercial glassware production line where the ware is formed, initially cooled, and then annealed, the particulate material is advantageously applied immediately after forming and prior to annealing thereby providing hot end protection. Preferably such material is fusible, such as glass frit, and has a fusing temperature below the annealing temperature of the glassware. When so applied, an added feature of the present invention is the self-healing character of the coating. The particulate material lowers the coefficient of friction and provides abrasion resistance to the glass surface during its hot end travel by bearing most of the force generated by contact between the surface and other surfaces. Any damage to the low-temperature fusible material will then be self-healed during the annealing of the glassware. This prevents fractures in the damaged coating from propagating to the glass surface during subsequent use. Hence, the particulate material emerges from the annealing process with its original strength and capability to prevent damage to the glass surface. In using a low-temperature, fusible material, energy efficiency is also promoted for a portion of the retained heat of formation of the glassware may be utilized to fuse and bond the material as may the following annealing process.

It is not completely understood why providing a glass surface with a bonded coating of fine particles should, in coaction with an outer lubricious coating, provide the glass surface with desirable properties of scratch resistance and lubricity; but it is believed that the microroughened glass surface that results from the distribution of fine particles favorably bonds and presents the lubricious outer coating for surface-to-surface contact. It is thought that the discontinuous distribution of particulate material forms a surface array of interstitial spacing throughout the glass surface which provides a reservoir for the lubricious coating to the uppermost portions of the particulate material which retains the lubricious coating therebetween and prevents the breakdown of the lubricious coating when in contact with other surfaces. Also, as significantly increased abrasion resistance is measured with the fine particulate material alone, even without the lubricious coating, it is thought that the fine particles bear most of the forces of any contact and yield under stress (i.e., are separable from the substrate upon the application of shear force to the particles), thereby localizing any damage and providing a ball-bearing-like lubricating effect. This minimizes the plastic deformation and abrasion which the surface is subjected to. It is thought that the particles will yield before plastic deformation limits of the vitreous surface are reached. Even with the to be discussed preferred light coverage, it can be shown that the chance of contact with the substrate is remote. The overriding probability is that any contact between the vitreous surface and other objects, including like surfaces, will occur completely between the bonded particles.

Fine particles capable of providing such a microroughened coating can include those having a size in the range from 180 mesh or about 100 microns to under 1 micron and typically having a size of minus 200 mesh, meaning that such particles will pass through a No. 200 mesh sieve, U.S. Bureau of Standards Sieve Size. A 200 mesh sieve is comprised of a wire mesh with openings of 0.0029 inches on a side. Preferably such fine particles should have an average size of under 10 microns and should be of a material capable of adhering or being bonded to the glass surface. Glass particles are the preferred material and can be bonded to a glass surface at or above its annealing temperature which is generally between about 900° F. and 1100° F. For greatest energy efficiency, glass particles having a low fusing temperature roughly equivalent to or less than the annealing temperature of the glass surface should be applied at the hot end, thereby not requiring an additional heating step for bonding. Such particles may be formed by manufacturing low fusing temperature glass, grinding the glass in a ball mill and using conventional air separation techniques to obtain particles under 10 microns in size. Also, commercial apparatus is available to grind glass to desired sizes including the 10 micron range. Numerous methods, which are well known in the art, are available to manufacture low fusing temperature glass. Some of these methods are disclosed in Chapter 7 of *Porcelain Enamels* (2nd Ed. 1961), by A. I Andrews which is herein incorporated by reference.

Glass is also advantageous in that optical coupling is easily obtained in fusing the particles to the surface. By optical coupling, it is meant that the particles are undetectable to the unaided eye such that the glass surface is not esthetically altered by the present invention. Furthermore, the fused glass particles when in the above-preferred size range, will not be tactile to one handling the glass surface.

Other suitable fine particles include sand, sodium silicate, organic solid titanates, and the like. Although with sand and other high melting temperature materials, the glass surface must be treated to promote the adhesion of the fine particles by a preliminary sodium silicate coating, or a low fusing temperature frit.

In considering the projected surface area actually covered by the particles in relation to the total surface area of the glass surface prior to treatment, it has been found that coverage of between about 5 percent and 85 percent results in similar scratch resistant properties. The preferred coverage is about 10 percent thereby providing a sufficient margin of safety in coverage while achieving economy in the use of the particulate material. Further economy in use of particulate material may be provided by using particles having an average size under 10 microns and preferably under 5 microns. It has been found that the smaller particles yield measurably better scratch resistance.

The outer coating is a material that can be uniformly applied over the micro-roughened glass surface. Many organic polymers provide a dry, lubricious surface suitable for this application. Polyolefin materials, such as polyethylene, are preferred for such outer coatings although nylon and polyfluoroethylene polymers and esters can also be used. Such lubricious organic materials can be applied to the micro-roughened glass surface by providing a dispersion or emulsion of such materials in a liquid carrier, which can be water, and spraying the micro-roughened glass surface with the dispersion or emulsion for subsequent curing into a coating.

EXAMPLE I

In a preferred embodiment of this invention, ground glass powder of minus 200 mesh (as defined above) with an average size of under 10 microns are bonded to a glass surface and the micro-roughened glass surface is provided with an outer coating of polyethylene.

A suspension of glass particles in water was prepared by adding 65 grams of such powdered glass into 500 milliliters of water and maintaining a uniform suspension of such glass particles in water by constant stirring. The suspension of fine glass particles in water was atomized to produce a spray of droplets of water containing fine glass particles. The fine spray of droplets was created by apparatus such as that disclosed in U.S. Pat. No. 3,989,004 which is incorporated herein by reference. The spray from the atomizer was charged, for example, by a single needle electrode connected to a source of 35,000 volts d.c. The electrostatically charged spray was deposited on the glass surface which was heated to its annealing region just below deformation temperatures and placed on a grounded stand to maintain it at a spray-attracting potential. The glass particles were permanently bonded to the otherwise smooth glass surface giving the glass surface a roughened texture. The glass surface was then allowed to cool to the usual cold end coating temperatures of about 250° F. At 250° F. the glass surface with its micro-roughened surface was coated with a dispersion of polyethylene in water. The polyethylene was fused to provide a lubricious outer coating.

Although not necessary, electrostatic deposition of the droplets is more easily obtained on the glass article if it is heated to near its annealing temperature and maintained at a spray-attracting potential by contact with a grounded support.

After this surface was provided with the lubricious polyethylene coating, it was tested for the lubricity of the resulting surface. Such a standard test consists of a pyramid of three glass jars which are tilted using a standard test apparatus. The tangent of the angle at which the top jar slides is recorded as the coefficient of friction and measure of the lubricity of the surface of the glass jars. This test was performed on four jars having glass surfaces prepared as set forth in the example above. With the glass surfaces both dry and wetted the following data was obtained:

| Jar No. | Dry Slide | Wet Slide |
|---|---|---|
| 1 | 0.15 | 0.33 |
| 2 | 0.15 | 0.55 |
| 3 | 0.15 | 0.50 |
| 4 | 0.15 | 0.50 |

Commercially satisfactory values for the dry slide test are 0.2 and for the wet slide test are 0.35.

In addition, four scratch tests were run using standard test apparatus in which one jar is forced against another at a known load and at a 45° angle and moved. A microphone and an electronic switch mechanism indicate the load level at which scratching occurs by the sound emitted. This test was also performed with the glass surfaces both dry and wet. The load in pounds sufficient to cause a scratch in each of the four tests is recorded below.

| Jar Couple | Dry | Wet |
|---|---|---|
| 1-2 | 37 | 70 |
| 1-3 | 50 | 46 |
| 3-4 | 45 | 56 |
| 2-4 | 56 | 53 |

Commercially satisfactory values in this test are 50 lbs. with dry surfaces and 35 lbs. with wet surfaces.

It is thus apparent that these glass articles have surfaces with scratch resistance that exceeds commercial standards and surface lubricity which exceeds commercial standards when dry and is in the order of commercial standards when wet.

The fine particulate material may be applied to the glass surface in any number of ways, in addition to that illustrated in the example above.

EXAMPLE II

In a second preferred embodiment of this invention, which is the commercially preferred embodiment, low-fusing temperature glass particles of minus 200 mesh with an average size of under 5 microns are applied to a glass surface by a dry powder electrostatic deposition process.

The low-fusing temperature glass particles were obtained by manufacturing glass of the following batch composition:

| | | |
|---|---|---|
| | $SiO_2$ | 22.6% |
| | $Na_2O$ | 20.9% |
| | $B_2O_3$ | 28.2% |
| | CaO | 28.2% |

The molten glass was quenched in water and reduced to about 100 micron particle size in a ball mill. The glass particles were further reduced to under 1 micron to 5 micron range and applied to vitreous surfaces by the apparatus of FIG. 1.

The apparatus includes a grounded metal conveyor 11 which carries vitreous articles such as containers 12 through a coating chamber 16. The coating chamber has a door 18, an adjustable entrance 19 and exit 20, and an electrostatic filter 21 which has an entrance 42 from the coating chamber. The electrostatic filter is of the type disclosed in my copending U.S. application Ser. No. 103,433 filed Dec. 4, 1979 which is herein incorporated by reference.

The 100 micron frit is loaded into a vibrating feed system 46, which consists of a cone vibrator 22, and a vibrating trough 23. The frit is fed from the vibrating feed system to the inlet 24 of a micronizer 30.

Plant pressurized air is provided through hose 43 to solenoid actuated valve 44. The pressurized air travels through filter 50, manual on-off valve 51 and hose 52 to the micronizer air system. A first source of pressurized air 26 is connected to the inlet 24 and a second source of pressurized air 27 is connected to the grinding chamber inlet 28 of micronizer 30. Both air pressures are adjustable by regulators 31. An exhaust chamber 32, having four outlets 33, is attached to the exhaust 34 of the micronizer. Four hoses 37 are connected between the outlets 33, and four ceramic nozzles 38 in coating chamber 16. The ceramic nozzles are located two on each side of conveyor 11 and are aimed at the path articles carried by said conveyor will travel through the coating chamber, such as glass container 12. Each of the ceramic nozzles have a needle electrode at their center which is connected to a high voltage source through wires 53. A control panel 41 turns on the system and adjusts the voltage on the needle electrodes and the speed of the conveyor. A cover 45 is placed over the micronizer and feed system.

The micronizer 30, is a commercially available fluid energy mill which is capable of grinding particles to the low and submicron range in a single grinding operation. A series of tangential nozzles in a circular chamber spin the particles around at high speed. Contact between the particles micronizes them and the circumferential forces hold oversized particles in the grinding area while only small particles are exhausted. In this example, a 2 inch micronizer produced by the Sturtevant Mill Company was utilized. A significant characteristic of such fluid energy mills is that the particulate material continues to be shattered and reduced in size until sufficiently small to be air carried by the exhaust air out of the mill.

In accordance with the disclosed apparatus, particles of frit having a size range of around 100 microns were fed into micronizer 30, reduced to low micron and submicron range by said micronizer and carried by flowing air through hoses 37 to ceramic nozzles 38. The emitted spray of micron range particles were charged by the needle electrode and deposited on a glass surface carried by the conveyor which was at about its annealing region just below deformation temperature and maintained at a spray-attracting potential by its contact with the metal conveyor. After application of the particles, the glass surfaces were heated to their annealing region and the particles were permanently fused thereon resulting in a discontinuous distribution of particle material thereover. After cooling to below 300° F., the surfaces were coated with a dispersion of polyethylene in water. The polyethylene was fused to provide a dry lubricious outer coating.

In the present example, the conveyor was adjusted to operate at about 1 foot per second. The first source of pressurized air which was connected to inlet 24 was regulated at 40 pounds per square inch and the second source of pressurized air which was connected to grinding air inlet 28 was regulated at 85 pounds per square inch.

Three tests were run with the only difference being the setting of the vibrating feed control which determined the amount of frit fed into the micronizer. All jars were heated to 1000° F., and then run through the application apparatus described above with the following vibrating feed settings:

| Vibrating feed setting | Jar Group Marking |
|---|---|
| ½ gram per minute | X |
| 1½ gram per minute | Y |
| 3½ grams per minute | Z |
| Control - no coating | C |

After coating, all jars were heated to 1250° F., and held there for about five minutes until the frit had fused to the surfaces.

Jars from each group were then, upon cooling to 300° F., coated with a dispersion of polyethelene in water, marked, and after cooling to room temperature, subjected to the scratch and slide tests described in Example 1.

Arbitrarily, the jars marked "2" were tested in three different locations for each jar, and are reported as follows:

| Jar | Dry | Avg. | Wet | Avg. |
|---|---|---|---|---|
| | | Scratch Test | | |
| C2 | 20,20,20 | 20 | 25,25,20 | 23 |
| X2 | 65,60,45 | 57 | 75+,75+,75+ | 75+ |
| Y2 | 65,75+,70 | 70 | 75+,70,75 | 73 |

| Jar | Dry | Avg. | Wet | Avg. |
|---|---|---|---|---|
| Z2 | 65,75+,60 | 67 | 70,60,60 | 63 |
| Slide Test | | | | |
| C2 | .15,.15,.5 | .15 | .45,.55,.60 | .53 |
| X2 | .15,.20,.20 | .18 | .35,.50,.45 | .43 |
| Y2 | .20,.20,.15 | .18 | .30,.30,.40 | .33 |
| Z2 | .15,.20,.20 | .18 | .40,.30,.50 | .40 |

In comparing Example I and II, results of all tests are similar. Again, the wet scratch results are considerably above acceptable commercial values while dry scratch results are commensurate therewith.

The dry slide results are clearly within commercial requirements of 0.2 while the wet tests are somewhat high. Further, there is no significant difference in tests of the three coated jars although substantially different amounts of coating were placed on the surfaces. It is thought that if at least a minimum of 2 to 5 percent coverage is achieved, the above results will be attained. The limiting maximum coverage factor is the physical appearance and feel of the surface.

Similar test results have been obtained in using an apparatus similar to Example II except with a fluidized bed of already ground under 5 micron particles instead of on-the-spot grinding with the micronizer. Although results were similar, consistency in coating was very difficult to attain for the small micron particles tend to agglomerate into masses of varying sizes. Once in such an agglomerated state, it was found very difficult to separate the masses into fine particles again for application. It has been found that greater consistency in application is achieved with on-the-spot grinding than is possible with electrostatic aided application without such on-the-spot grinding.

Other electrostatic means of application include using a greater number of nozzles with wire electrodes and dipping the articles in an electrostatic fluidized bed. Further electrostatic application means are illustrated in Chapter 11 "Electrostatic Coating" by Miller of *Electrostatics and Its Applications* edited by A. D. Moore (1973) which is herein incorporated by reference.

In addition to electrostatic deposition, fine particulate material may be applied non-electrostatically in a water suspension or while the glass surface is either heated or near room temperature. Where the glass surface is sprayed with a waterborne suspension of fine particulate materials such as glass, it may be subsequently heated to or above its annealing temperature and near its deformation temperature to evaporate the water and to bond the fine particulate material to the glass surface.

It is believed that such glass articles can be manufactured by the method above with a number of fine particulate materials that are capable of adhering to the glass surface. It is believed that of primary importance to this invention is that the glass surface be roughened by bonded fine particles to coact with the subsequent organic lubricating coating applied thereto and to promote its lubricity. Other fine particulate materials may not, in themselves, bond to glass surfaces in the manner that fine particles of glass will bond to a glass surface near its deformation temperature, but such other particles may be encouraged to adhere to a glass surface which has been treated to promote such adherence by, for example, a low melting flux.

It will be understood, therefore, that in its broadest sense the method of our invention includes creating a spray of fine particles of solid material capable of adhesion to the glass surface and depositing the fine particles on the glass surface which has been treated for their adherence. To increase the abrasion resistance and lubricity in later ware handling, filling and packing, a dry lubricious organic material may subsequently be applied to the glass surface to provide a scratch resistant lubricated glass surface. More preferably, the glass surface is treated with particulate material while near its annealing temperature immediately after forming. It is maintained at a spray attracting potential and the spray of fine particles can be charged for electrostatic deposition and bonding to the hot glass surface. Preferably the particles are a fusible material such as glass, which will protect the glass surface through the hot end and self-heal and bond in the annealing process. After cooling to below 350° F., a dry lubricious polyolefin material such as polyethylene is applied. The result of such methods is an article having a glass surface comprising a distribution of finely divided particles adhering to the glass surface with a lubricious organic coating over the glass surface and its distribution of finely divided particles. In a specific preferred embodiment, the finely divided particles on the glass surface are glass particles of minus 200 mesh having an average size of under 10 microns and preferably providing an average height of relief of between 2 and 10 microns, and, more preferably, an average height of relief of less than 5 microns coated with a thin polyethylene outer coating.

Modifications can be made to the preferred embodiment described above without departing from the spirit and scope of my invention as set forth in the following claims.

What is claimed is:

1. A glass article having an abrasion-resistant surface comprising:
    a vitreous substrate;
    a discontinuous uniform distribution of low-melting vitreous particulate matter optically coupled and fused to said substrate with varying degrees of security and invisible to the unaided eye, said particulate matter being separable from said substrate upon application of shear force to said particulate matter, said discontinuous distribution providing a surface array of interstitial spacing throughout said substrate wherein said discontinuous distribution of particulate matter has a surface area actually covered by particles of less than 15 percent of the total surface area of said substrate and an average height of relief of between 2 and 10 microns; and
    a lubricious outer coating over said article, said interstitial spacing providing a reservoir of lubricious coating to the uppermost portions of said particulate matter when in abutting contact with a surface having motion relative to said substrate.

2. The article of claim 1 wherein said lubricious outer coating comprises an organic coating.

3. The article of claim 1 wherein said particulate matter has an average height of relief of less than 5 microns.

4. The article of claim 1 wherein said particulate matter comprises glass particles.

* * * * *